(12) United States Patent
Hinterberger et al.

(10) Patent No.: US 10,998,739 B2
(45) Date of Patent: May 4, 2021

(54) BATTERY DEVICE HAVING AT LEAST ONE MODULE STRING, IN WHICH MODULE STRING MODULE UNITS ARE INTERCONNECTED ONE AFTER THE OTHER IN A ROW, AND MOTOR VEHICLE AND OPERATING METHOD FOR THE BATTERY DEVICE

(71) Applicant: AUDI AG, Ingolstadt (DE)

(72) Inventors: Michael Hinterberger, Grossmehring (DE); Berthold Hellenthal, Schwanstetten (DE); André Blum, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/612,931

(22) PCT Filed: Apr. 5, 2018

(86) PCT No.: PCT/EP2018/058733
§ 371 (c)(1),
(2) Date: Nov. 12, 2019

(87) PCT Pub. No.: WO2018/206201
PCT Pub. Date: Nov. 15, 2018

(65) Prior Publication Data
US 2020/0212687 A1    Jul. 2, 2020

(30) Foreign Application Priority Data

May 11, 2017   (DE) .................... 10 2017 207 944.4

(51) Int. Cl.
*B60L 1/00*     (2006.01)
*B60L 3/00*     (2019.01)
(Continued)

(52) U.S. Cl.
CPC ............ *H02J 7/0024* (2013.01); *B60L 50/51* (2019.02); *B60L 53/00* (2019.02); *B60L 58/19* (2019.02);
(Continued)

(58) Field of Classification Search
CPC ..... H02J 7/0024; H02J 2207/20; B60L 53/00; B60L 58/19; B60L 50/51; H01M 10/4207;
(Continued)

(56) References Cited

FOREIGN PATENT DOCUMENTS

DE    102010027864 A1    12/2011
DE    102010041040 A1     3/2012
(Continued)

OTHER PUBLICATIONS

English translation of International Preliminary Report on Patentability dated Nov. 14, 2019, in corresponding International Application No. PCT/EP2018/058733; 8 pages.
(Continued)

*Primary Examiner* — Richard Tan
(74) *Attorney, Agent, or Firm* — Maier & Maier, PLLC (57) ABSTRACT

Electrical battery device having at least one module string, in which multiple module units each including at least one battery module are electrically interconnected one after another in a series, wherein one end of the series is electrically connected to a respective battery terminal of the battery device. A respective bridging circuit is provided in the at least one module string in each case for each of its module units, which is configured to alternately bridge the respective module unit and interrupt the bridging again in dependence on a switching signal, wherein a control unit is configured to bridge at least some of the module units in chronological succession and chronologically thereafter to
(Continued)

interrupt the bridgings again by setting the switching signal in periodically successive switching sequences.

10 Claims, 6 Drawing Sheets

(51) Int. Cl.
   *H02G 3/00* (2006.01)
   *H02J 7/00* (2006.01)
   *B60L 53/00* (2019.01)
   *B60L 58/19* (2019.01)
   *B60L 50/51* (2019.01)
   *H01M 10/42* (2006.01)
   *H01M 10/46* (2006.01)
(52) U.S. Cl.
   CPC ....... *H01M 10/4207* (2013.01); *H01M 10/46* (2013.01); *H01M 2220/20* (2013.01); *H02J 2207/20* (2020.01)
(58) Field of Classification Search
   CPC ... H01M 10/46; H01M 2220/20; Y02E 60/10; Y02T 90/14; Y02T 10/7072; Y02T 10/70
   USPC .......................................................... 307/10.1
   See application file for complete search history.

(56) References Cited

FOREIGN PATENT DOCUMENTS

| | | |
|---|---|---|
| DE | 102011087031 A1 | 5/2013 |
| DE | 102012216158 A1 | 3/2014 |
| DE | 102013208583 A1 | 11/2014 |
| DE | 102015205278 A1 | 9/2016 |
| EP | 2 905 889 B1 | 12/2017 |

OTHER PUBLICATIONS

German Examination Report dated Mar. 14, 2018 in corresponding German Application No. 102017207944.4; 16 pages; Machine translation attached.

International Search Report and Written Opinion dated Jun. 27, 2018 in corresponding International Application No. PCT/EP2018/058733; 28 pages; Machine translation attached.

Fig. 1

--Prior Art--

BATTERY DEVICE HAVING AT LEAST ONE MODULE STRING, IN WHICH MODULE STRING MODULE UNITS ARE INTERCONNECTED ONE AFTER THE OTHER IN A ROW, AND MOTOR VEHICLE AND OPERATING METHOD FOR THE BATTERY DEVICE

FIELD

The disclosure relates to an electrical battery or battery device having at least one module string. "Module string" means that multiple module units are electrically connected one after another in series, in order in this way to add up partial voltages which are generated by the module units to form a total voltage or battery voltage. The disclosure also includes a motor vehicle and a method for operating the battery device.

BACKGROUND

In conjunction with the disclosure, a battery device is an electrical accumulator, which can thus be charged and discharged. In such a battery device, it can be provided that multiple module units are interconnected one after another in a series to add up the partial voltages generated by the module units to form a total voltage in said way. One end of such a series is electrically connected to a battery terminal of the battery device. A battery terminal is in this case an externally accessible electrical contact for tapping the total voltage of the module string. Each of said module units connected in series can comprise one battery module or multiple battery modules. In the case of only one battery module, the module unit can be identical to the battery module, if all components of the module unit are integrated into the battery module. If multiple battery modules are provided in a module unit, these can thus be connected in parallel, to increase the electric current generated by a module unit in this way, or in series, to set the partial voltage of the module unit. A single battery module can comprise multiple battery cells and the galvanic cells, to generate a cell voltage electrochemically in the known manner.

A battery device of the described type can be provided in a motor vehicle, for example, as a high-voltage battery or traction battery. "High voltage" is to be understood in conjunction with the disclosure as an electric voltage greater than 60 V, in particular greater than 100 V. The electric voltage generated in known battery devices at the battery terminals is a DC voltage. To operate an electrical machine of a traction drive of a motor vehicle thereby, the electric DC voltage has to be fed into an intermediate circuit, in which an intermediate circuit capacitor buffers electrical energy and from which an electrical power converter taps the DC voltage and generates multiple AC voltages, which are each fed into one stator winding of a stator of the electrical machine, as a rotary phase AC voltage. Another designation for rotary phase AC voltage is multiphase AC voltage or polyphase AC voltage (polyphase system, multi-phase electric power).

The provision of the intermediate circuit capacitor and the power converter in a motor vehicle means a component expenditure which increases the production costs of the motor vehicle.

In conjunction with the energy conversion in the low-voltage and moderate-voltage range, the modular multilevel converter (MMC) is known from the prior art, by means of which, for example, for a high-voltage DC transmission, submodules are connected in series, wherein each submodule comprises an intermediate circuit capacitor and an IGBT half-bridge (IGBT—Insulated Gate Bipolar Transistor). Capacitors and semiconductor switches are thus combined for the conversion in such a modular multilevel converter. Nonetheless, such a modular multilevel converter also has to be connected as an additional component between a high-voltage battery and an electrical machine, which means an additional component expenditure.

SUMMARY

The invention is based on the object of enabling the operation of an electrical machine by means of a battery device.

The electrical battery device described at the outset having the at least one module string is refined according to the invention in that a respective bridging circuit is provided in the at least one module string in each case for each of its module units, which bridging circuit is configured to alternately bridge the respective module unit and to interrupt the bridging again in dependence on a switching signal. Bridging means that two terminal contacts of the module unit, via which the module unit is connected in series, are electrically short-circuited or connected. An electric current can then flow directly between the terminal contacts, i.e., while bypassing the at least one battery module of the module unit. Upon interruption of the bridging, in contrast, a current has to flow from the one terminal contact through the at least one battery module of the module unit to the other terminal contact.

In the battery device, a control device is furthermore configured, by generating or defining the switching signal in periodically successive switching sequences, bridging at least one of the module units in chronological succession in each case (i.e., per switching sequence) and thereafter interrupting the respective bridging thereof again in chronological succession. A switching signal is thus generated by the control device by which module units are bridged in succession in each switching sequence. In this way, the total voltage at the battery terminal sinks step-by-step with each bridging. Thereafter or subsequently, the bridgings are interrupted or ended again in succession. In this way, the total voltage at the battery terminal rises again step-by-step with each interrupted or ended bridging, i.e., with each switching on of a further module unit. Overall, an AC voltage having multistep drop (successive bridging of module units) and multistep rise (successive switching on of module units of the series) thus results at the battery terminal. Because the switching sequence is periodic, i.e., successive, adjoining switching cycles are carried out repeatedly, a periodic curve of the AC voltage results. This AC voltage is generated from the respective partial voltage of each module unit. An AC voltage is thus provided or generated directly at the respective battery terminal of the at least one module string from the DC voltage which each module unit generates (partial voltage) within the battery device. In this case, this is thus not the simple switching on and switching off of the total voltage. Rather, multiple module units, in particular at least 5 module units, are provided per module string. Therefore, at least two intermediate steps thus result, in particular at least 4 intermediate steps, in which the drop of the AC voltage and the rise of the AC voltage occurs. The maximum provided total voltage (amplitude of the AC voltage) is preferably a high-voltage potential.

The advantage results due to the invention that the battery device itself can provide an AC voltage in each case at a respective battery terminal using its at least one module string. An additional intermediate circuit and an additional power converter are thus not necessary, which would have to be connected between the battery device and an electrical machine. The AC voltage of each battery terminal can be fed directly into a stator winding of a stator of the electrical machine in each case.

The disclosure also includes refinements, by way of the features of which additional advantages result.

The AC voltage occurs in relation to a reference potential. This results at the respective other end of each module string. One refinement provides that this reference potential is provided at a further battery terminal. In other words, a further battery terminal is thus electrically connected to the other end of the module string.

To be able to operate an electrical machine directly by means of the battery device, a rotary phase AC voltage is necessary. For this purpose, one refinement provides that the battery device comprises at least 3 module strings of the type mentioned and the control device is configured to set the periodic switching sequences of the module strings phase-offset in relation to one another and in this way to generate the rotary phase AC voltage at the battery terminals of the module strings.

A multiphase rotary current can thus be emitted directly from the battery device at the battery terminals. 3 module strings or also more than 3 module strings, in particular more than 5 module strings, can be provided. Said control device for generating the switching signal controls the phases of the switching sequences or coordinates the switching sequences of the different module strings. In a battery device having 3 module strings, the phase offset would be 120°. In general, the phase offset with N module strings is provided as 360°/N.

As a reference potential, it can be provided that in each module string, a different end of the series is electrically connected to a common neutral point in each case. The rotary phase AC voltage is thus generated with respect to the neutral point. In this way, an electrical connection is advantageously not necessary between an electrical machine operated by the battery device and the reference potential.

The control of the individual bridging circuits of all module units of all module strings requires a plurality of switching commands, so that a correspondingly broadband switching signal is necessary for switching all bridging circuits. To reduce a transmission bandwidth for transmitting switching commands here, the control device can be designed in multiple parts or distributed. The control device can comprise at least one separate string control unit for each module string. Furthermore, a central control unit can be provided for all module strings together. Each string control unit of each module string is configured in this case to carry out the respective switching sequence of the respective module string independently, i.e., to bridge the module units in succession and subsequently to interrupt the bridgings again in succession.

In this case, a switching rate or the time interval between the switching processes of the bridging circuits is set in dependence on a predetermined frequency value. The switching rate is thus the time interval of the switching processes at the individual module units. If a string control unit is thus triggered or activated, it thus carries out the switching sequence independently at least once. Switching commands for each bridging unit thus do not have to be transmitted individually to the module string. The central control unit is configured to set the frequency value in the string units, i.e., to specify the switching rate thereof, and to trigger the switching sequences of the module strings in a phase-offset manner. The central control unit thus only has to emit a trigger command once per switching sequence or even only once per multiple switching sequences. A trigger command therefore only has to be emitted originating from the central control unit at a lower rate than the switching rate. The frequency value can be set in dependence, for example, on a speed specification for the electrical machine, i.e., a predetermined target speed.

A module string does not have to be constructed monolithically. Each module string can be formed from at least two partial module strings connected in a series circuit. Each partial module string then comprises a part of said series of the module units of the module string. A modular structure of the module strings can thus be provided. Partial module strings may thus be replaced, for example, in the event of a defect of a module unit. This is more cost-effective than the replacement of a complete module string. Furthermore, partial module strings can be switched over among one another via a switching matrix to be able to provide module strings having different total voltage or maximum voltage.

To enable said electrical bridging of a module unit, said bridging circuit is necessary for each module unit. This can be designed as follows. Each module unit comprises two terminal contacts in the described manner, via which the module unit is connected in the series of the respective module string. In the respective bridging circuit, at least one semiconductor switch is configured to electrically short-circuit or connect the two terminal contacts in the electrically conductive state. This occurs exclusively in the electrically conductive state of the terminal contacts. If the at least one semiconductor switch is switched to electrically blocking, the terminal contacts are only electrically connected via the at least one battery module of the module unit. The partial voltage of the module unit is thus applied between the terminal contacts. To prevent a short-circuit current within the module unit upon bridging of the terminal contacts, at least one further semiconductor switch is configured to switch an electrical connection between a cell terminal of battery cells of the at least one battery module of the module unit, on the one hand, and one of the terminal contacts, on the other hand, i.e., to alternately establish and interrupt the electrical connection. This electrical connection to the battery cells is interrupted if the terminal contacts are short-circuited. The semiconductor switches can be coupled via a locking logic in such a way that respectively only either the bridging or the connection to the battery exists. This is known as locking.

Said semiconductor switches can each be formed on the basis of one transistor or multiple transistors. The dielectric strength of each semiconductor switch is preferably only sufficiently large that the electrical partial voltage of the module unit can be blocked. This presumes that the switched electric currents permit this, i.e., the voltages induced upon switching are sufficiently small. In particular, the dielectric strength of the at least one semiconductor switch is thus less in each case than the maximum possible maximum voltage of the module string. Such semiconductor switches are more cost-effective.

For the operation of an electrical machine, it is especially provided that the AC voltage has a stepped, sinusoidal time curve. In other words, a sine is emulated by the stepped curve of the fundamental oscillation. This can be achieved by setting the time intervals of the switching procedures of the switching sequences.

The electrical battery device is suitable in particular for operation in a motor vehicle. Accordingly, a motor vehicle having a traction drive is also provided by the invention, which comprises an electrical machine in which a stator is configured in a known manner to receive a rotary phase AC voltage for generating a magnetic rotary field at stator windings. To generate the rotary phase AC voltage, in the motor vehicle according to the invention, an embodiment of the battery device according to the invention is provided, wherein a respective battery terminal of at least one module string, in particular multiple module strings of the battery device, is electrically connected in each case to one of the stator windings of the stator. The electrical connection is in particular a direct electrical connection. In other words, a converter is not connected between the battery device and the electrical machine.

The battery device can also be provided, for example, as a stationary accumulator, for example, to provide AC voltage in a building.

The method according to the invention for operating the battery device results by way of the operation of the battery device according to the invention. In the at least one module string, in each case at least some of the module units are successively bridged and then the bridgings are interrupted again in succession by the control unit by means of at least one switching signal in periodically successive switching sequences, so that a periodic AC voltage having a multistep drop and subsequent multistep rise occurs at the battery terminal of the module string. An AC voltage having a fundamental frequency which can be defined by the switching rate of the bridging circuits and thus the duration of the switching sequence then results due to the periodic repetitions or continuation of this switching sequence.

The method according to the invention also comprises refinements which comprise features as have already been described in conjunction with the refinements of the battery device according to the invention. For this reason, the corresponding refinements of the method according to the invention are not described once again here.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and thus are each to be considered a component of the invention individually or in a combination other than that shown.

Furthermore, the described embodiments can also be supplemented by further ones of the above-described features of the invention.

In the figures, functionally-equivalent elements are each provided with the same reference signs.

Figure 1:
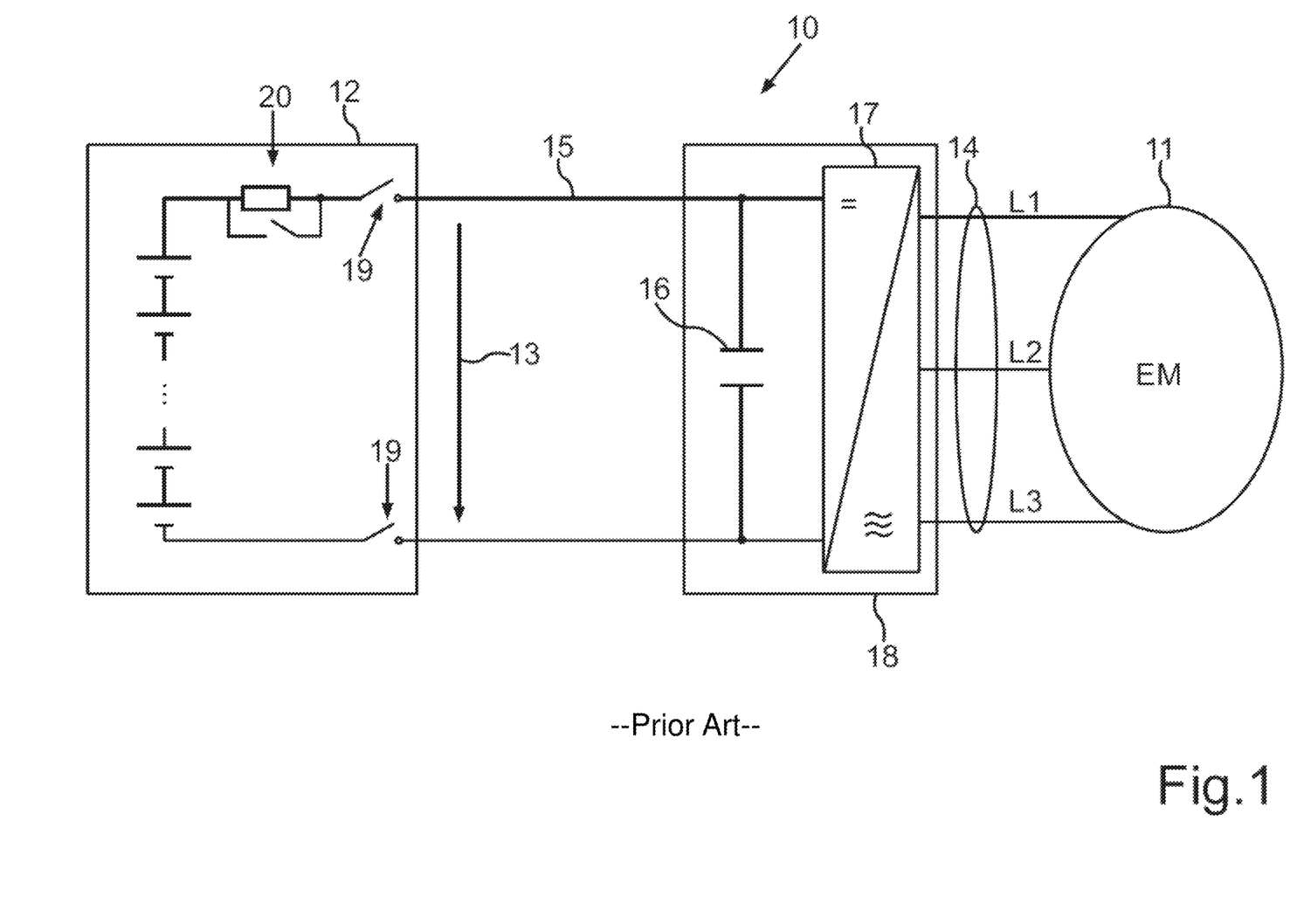
FIG. 1 shows a schematic illustration of a motor vehicle having electrical traction drive according to the prior art.

FIG. 1 shows a traction drive 10, which can be provided for a motor vehicle. The traction drive 10 can comprise an electrical machine 11 and a traction battery or high-voltage battery 12 known from the prior art. The high voltage battery 12 can provide a DC voltage 13, which is to be converted into AC voltages L1, L2, L3 for the operation of the electrical machine 11, wherein the AC voltages L1, L2, L3 together have to represent a rotary phase AC voltage 14.

For this purpose, an intermediate circuit 15 having an intermediate circuit capacitor 16 and a power converter 17 are necessary, which both have to be connected as an auxiliary module 18 between the high-voltage battery 12 and the electrical machine 11. To be able to switch off the intermediate circuit 15, furthermore individual switches 19 are necessary. These switches 19 can comprise contactors and/or semiconductor switches. To be able to limit a charging current of the intermediate circuit capacitor 16 upon switching on of the traction drive 10, a pre-charging circuit 20 is furthermore necessary.

The provision of the intermediate circuit capacitor 16, the power converter 17, the switch 19, and the pre-charging circuit 20 makes the traction drive 10 costly to produce and susceptible to component failures.

Figure 2:
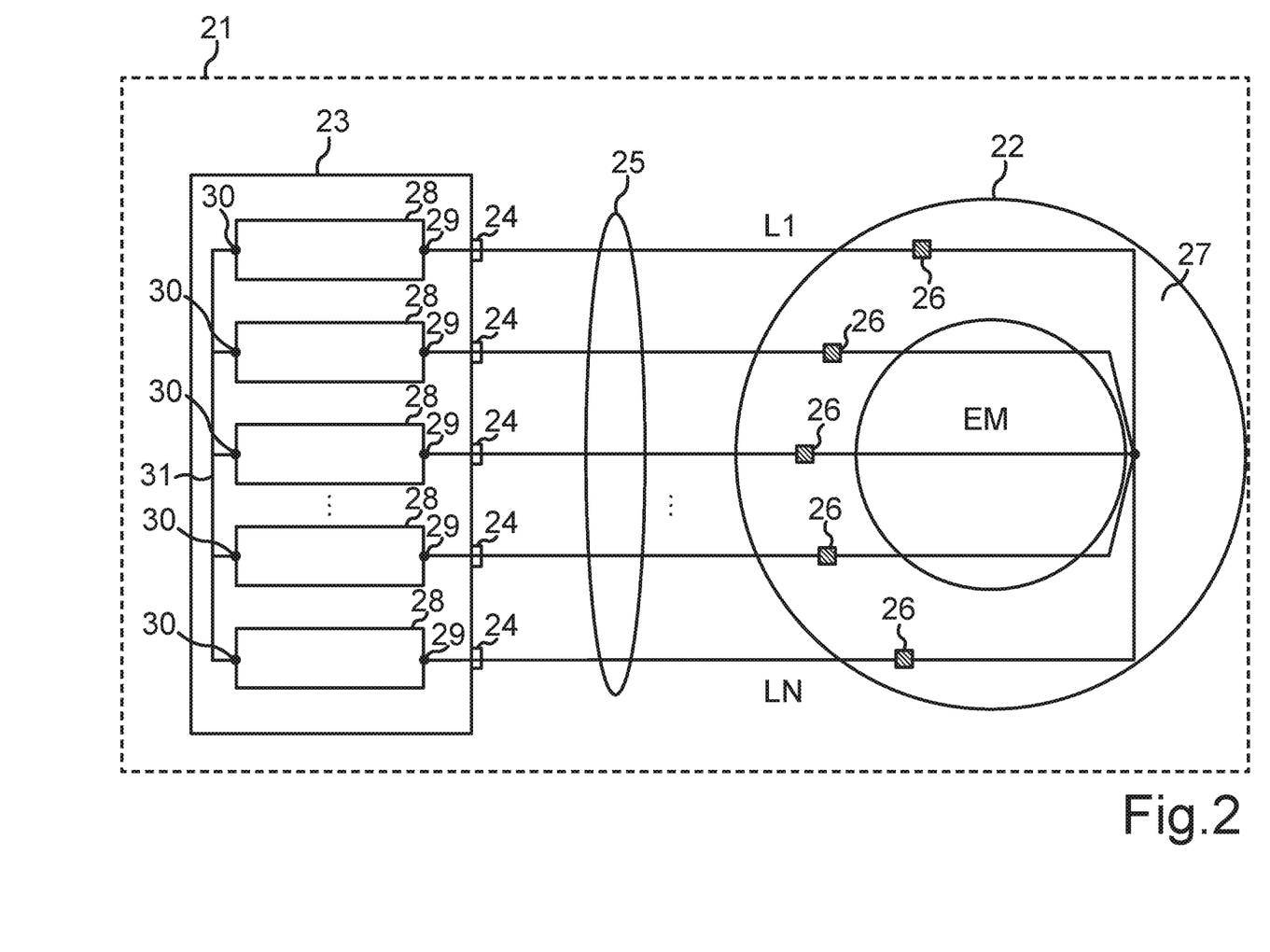
FIG. 2 shows a schematic illustration of an embodiment of the motor vehicle according to the invention.

FIG. 2 shows a motor vehicle 21, in which an electrical machine 22 (EM) can be connected directly to a battery device 23. For this purpose, an AC voltage L1, . . . , LN is provided at each of a total of N battery terminals 24 of the battery device 23, wherein the AC voltages L1, . . . , LN overall represent a rotary phase AC voltage 25 or an AC voltage system, i.e., are phase-offset in relation to one another.

By means of the AC voltages L1, . . . , LN, stator windings 26 of the electrical machine can be supplied or subjected to an alternating current, to in this way generate a magnetic rotary field for a rotor (not shown) of the electrical machine 22 in a stator 27 in a way known per se.

To generate or provide the AC voltages L1, . . . , LN at the battery terminals 24, battery device 23 can comprise module strings 28, in each of which one end 29 is respectively connected to a battery terminal 24. The respective other end 30 of each module string can be electrically connected or interconnected to a common neutral point 31. The respective AC voltage L1, . . . , LN is generated in each case with respect to the neutral point 31 by one of the module strings 28 in each case.

Figure 3:
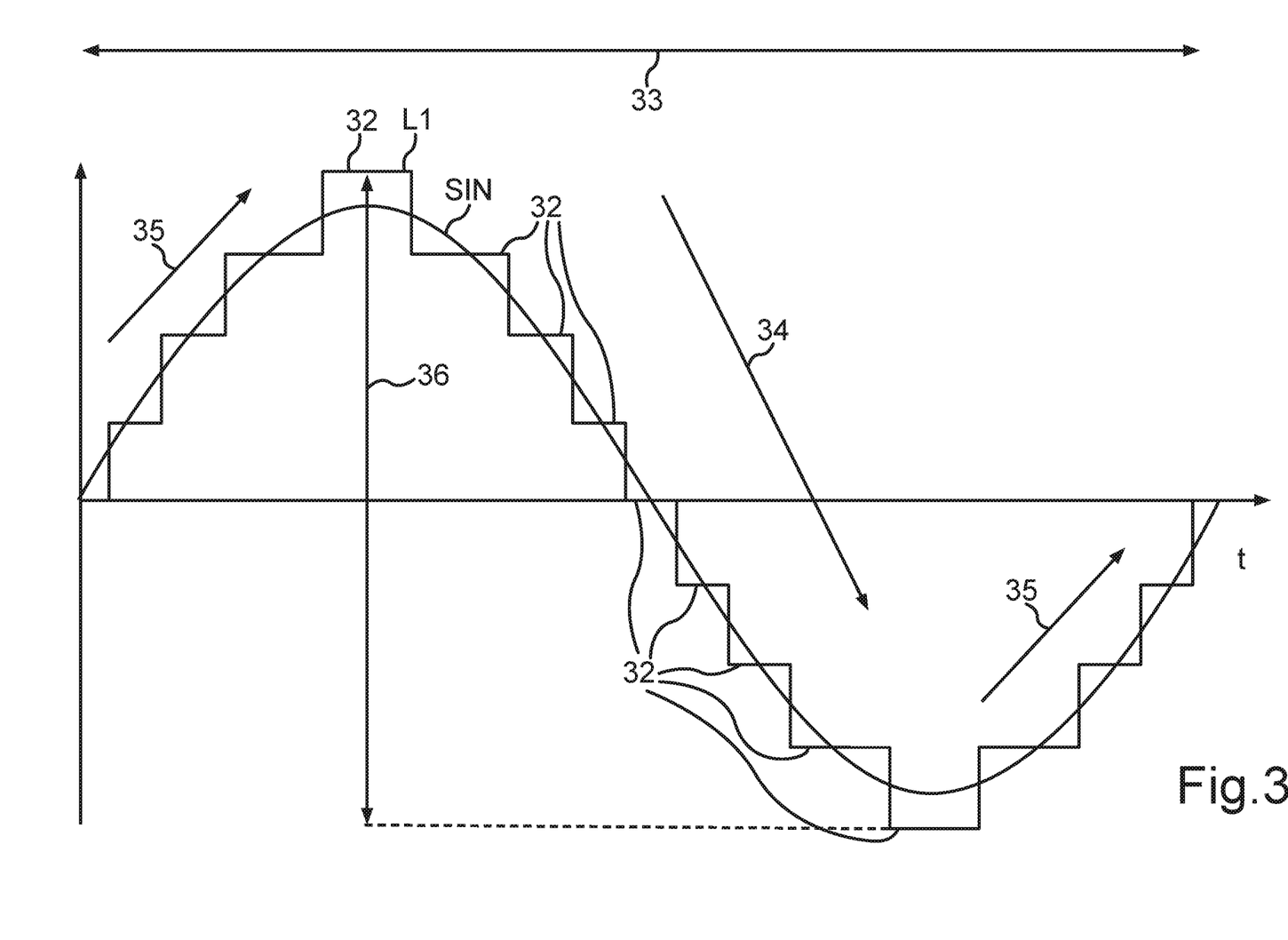
FIG. 3 shows a diagram having a schematic curve of an AC voltage as can be provided at a battery terminal of a battery device of the motor vehicle of FIG. 2.

FIG. 3 illustrates by way of example the time curve for the AC voltage L1 over the time t. The remaining AC voltages L2, . . . , LN are phase-offset in a way known per se with respect to the AC voltage L1. however, their time curve corresponds with respect to the shape to that of the illustrated AC voltage L1. The AC voltage L1 comprises multiple steps 32, in which the AC voltage carries out a drop 34 and a rise 35 within a switching period 33. The rise 35 is shown in two parts in FIG. 3, to illustrate that at the end of the switching period 33, it continues again at the beginning (of the next switching period). The AC voltage L1 overall has a curve of a sine SIN. Overall, a voltage range or a total voltage 36 results, which is generated or provided by the module string 28.

Figure 4:
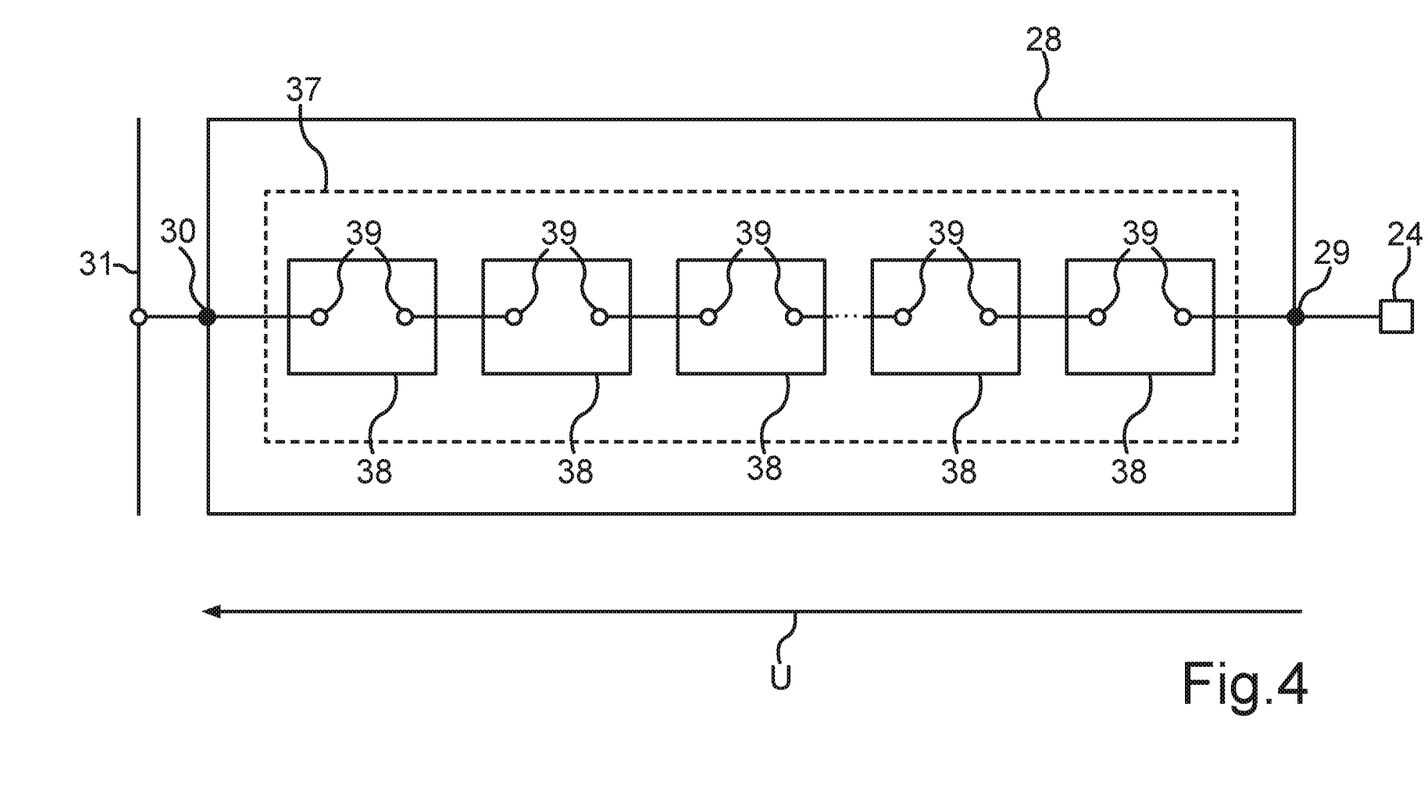
FIG. 4 shows a schematic illustration of a module string of a battery device of the motor vehicle of FIG. 2.

FIG. 4 illustrates a module string 28, the end 29 of which can be connected to a battery terminal 24 and the other end 30 of which can be connected to the neutral point 31. The module string 28 can comprise a series 37 of module units 38, which are connected one after another in the series 37. For this purpose, each module unit 38 comprises two terminal contacts 39, wherein each terminal contact 39 is electrically connected to one terminal contact of the next module unit 38 in the series 37. Of course, the last module units 38 in the series 37 each comprise one terminal contact 39, which is electrically connected to one of the ends 29, 30. The module string 28 generates a total voltage U between the ends 29, 30.

Figure 5:
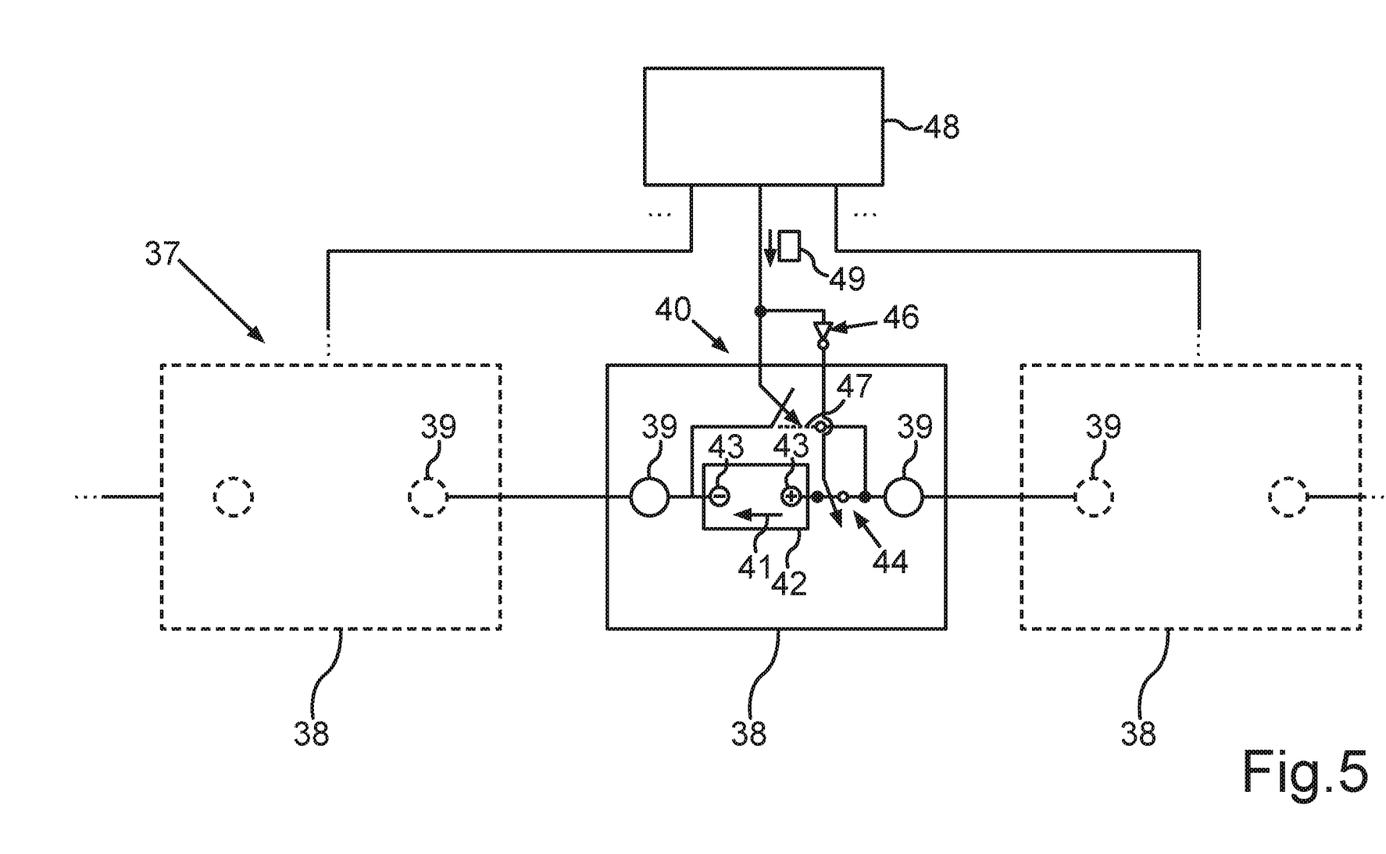
FIG. 5 shows a schematic illustration of module units of the module string of FIG. 4.

FIG. 5 illustrates on the basis of the example of a single one of the module units 38 how a partial voltage 41 of the module unit in the series 17 can be switched on and switched off by means of a respective bridging circuit 40 of each module unit 38. The total voltage U generated between the ends 29, 30 can be generated in this way step-by-step (i.e., according to the steps 32 shown in FIG. 3) by the respective partial voltages 41 of the module units 38. Each step can thus correspond to a partial voltage 41 or an integer multiple thereof.

The module unit 38 shown can comprise at least one battery module 42, between the cell terminals 43 of which the partial voltage 41 can be generated as a DC voltage of electrochemical cells in a way known per se. At least one cell terminal 43 can be interconnected via a semiconductor switch 44 of the bridging circuit 40 to a terminal contact 39 of the module unit 38. A further semiconductor switch 45 can be connected between the terminal contacts 39. In the closed or electrically conductive state, the terminal contacts 39 can be short-circuited or electrically connected by the semiconductor switch 45, so that a bridging 47 is provided. In the open or nonconductive state of the semiconductor switch 45, this bridging 47 is interrupted. It is symbolically illustrated by an inversion 46 in FIG. 5 that either the bridging 47 is set or the cell terminal 43 is electrically connected via the semiconductor switch 44 to the terminal contact 39. The inversion 46 is an example of the described locking. In general, however, another locking logic from the prior art can also be provided.

Each semiconductor switch 44, 45 can comprise one or more transistors. Each semiconductor switch 44, 45 is, for example, a parallel circuit made of multiple transistors.

A control device 48 can set the switching states of the switches 44, 45 of the bridging circuit 40 by way of a switching signal 49. Each module unit 48 can comprise a bridging circuit 40. The term "switching signal" means the total of all switching commands for all bridging circuits 40 here. The control unit 28 can comprise, for example, a microcontroller for generating the switching signals 49 for the bridging circuits 40.

By generating the switching signal 49, it can be defined by the control device 48 how many of the module units 38 are bridged and how many are connected in series. The module units 38 connected in series result overall in a total of the partial voltages 41 thereof, which add up to form the present total voltage U. The stepped curve of the AC voltages L1, L2, . . . , LN at the battery terminals 24, as shown in FIG. 3, can thus be set by the control device 48 by setting the number of the bridged module units 38 and by successively bridging and subsequently interrupting the bridgings 47.

For this purpose, the module units 38 do not have to be bridged sequentially by means of the respective bridging 47 in order to generate the AC voltage having the stepped curve according to FIG. 3. To utilize the module units 38 uniformly, a corresponding switching sequence can be set, due to which a uniform usage of the module units 38 of a module string 28 results. I.e., a difference between the energy quantity and/or power generated by each module unit 38 is less than a predetermined highest value.

Figure 6:
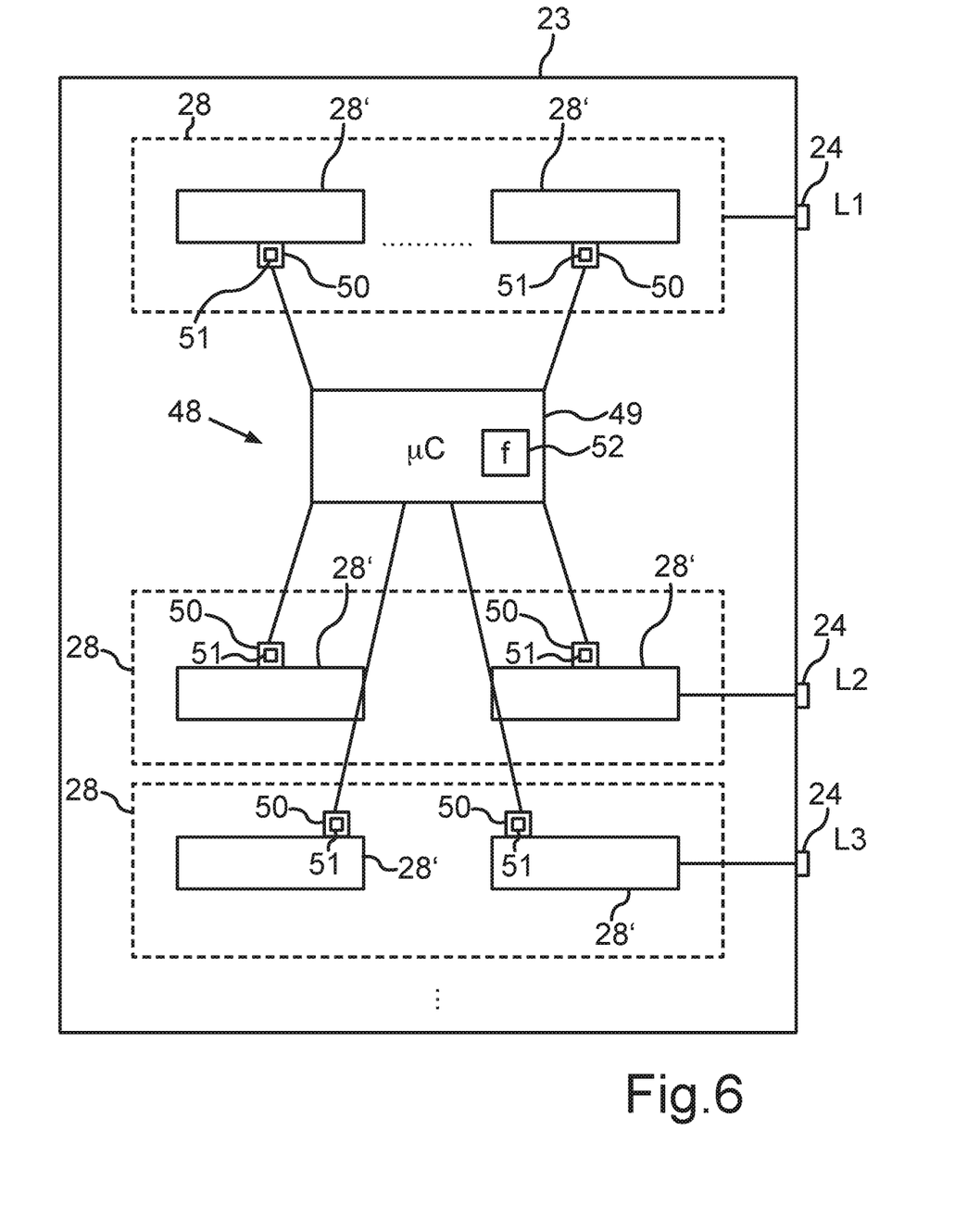
FIG. 6 shows a schematic illustration of an alternative design of the battery device of the motor vehicle of FIG. 2 having a distributed control device.

FIG. 6 illustrates an alternative design of the battery device 23. It can be provided in this case that each module string 28 is formed from a series circuit of multiple partial module strings 28'. Additionally or alternatively thereto, the control device 28 can be designed as a distributed device having one central control unit 49 and multiple string control units 50.

The central control unit 49 can comprise, for example, said microcontroller μC. Each string control unit 50 can be designed to set a switching sequence 51 the bridging circuits 40 independently in the module string 28 or in a partial module string 28', in order to switch a switching period 33 or a sequence of switching periods 33 in the respective module string 28 without an action of the central control unit 49. The central control unit 49 can coordinate the individual module strings 28 with respect to the phase offset or time offset thereof to generate the rotary phase AC voltage 25. In order to set a rotational velocity of the electrical machine 22, a frequency value 52 can be predetermined by the central control unit 49 at the string control units 50. The frequency f, which is described by the frequency value 52, can correspond to the period duration T of the switching period 33, wherein: $T=1/f$ applies.

The electrical charging of the module units 38 is possible without problems in the battery device 23. In one embodiment, the ends 29 of the strings 28 can be connected to a common charging terminal (not shown). For charging, a charging voltage can be generated between the neutral point 31 and the charging terminal by, for example, a charging device. The ends 29 can each be connected via a diode to the charging terminal, to avoid an equalizing current between the strings 28 among one another during the charging. In one embodiment, the strings 28 can be alternately connected to a charging terminal in time multiplexing. In one embodiment, it can be provided that multiple strings 28 are connected in series via additional switching elements, in order to be able to use a charging voltage which is greater than the maximum voltage absorbable by a string 28 for the charging.

In operation of the electrical machine 22, a recuperation (generator operation of the electrical machine) can also be carried out by means of the battery device 23. To use the generator voltage generated by the electrical machine 22 at the battery terminals 24 to charge the module units 38, a sufficient number of module units 38 is always connected in series in the strings 28 in a manner adapted to the time curve of the generator voltage that a charging current for the module units 38 which has at most a predetermined charging current strength, results by means of the instantaneously available voltage value of the generator voltage. The present voltage value can be detected in a manner known per se by means of a voltage measurement at the battery terminals 24.

Overall, the examples show how a high-voltage converter (HV converter) can be integrated into a high-voltage battery by the invention.

The invention claimed is:

1. An electrical battery device having at least one module string, in which a plurality module units, each of the plurality of module units comprising at least one battery module, are electrically interconnected one after another in a series, wherein one end of the series is electrically connected to a respective battery terminal of the battery device, wherein each of the plurality of module units is provided with a respective bridging circuit, which is configured to alternately bridge each module unit and interrupt the bridging again in dependence on a switching signal, wherein a control device is configured to bridge at least some of the plurality of module units in chronological succession and chronologically thereafter to interrupt the bridgings again by setting the switching signal in periodically successive switching sequences, so that a periodic AC voltage (L1, L2, L3, LN) having multistep drop and multistep rise results at the respective battery terminal of the module string wherein the battery device is configured to carry out a recuperation in operation of an electrical machine by means of the battery device, in order to use a generator voltage generated by the electrical machine at the respective battery terminal and a further battery terminal for charging the plurality of module units, by a sufficient number of the plurality of module units always being connected in series in the at least one module string in a manner adapted to a time curve of the generator voltage in such a way that a charging current for the plurality of module units, which has at most a predetermined charging current strength, occurs by means of an instantaneously available voltage value of the generator voltage.

2. The battery device according to claim 1, wherein the AC voltage (L1, L2, L3, LN) occurs in relation to a reference potential which is provided at the further battery terminal.

3. The battery device according to claim 1, wherein the battery device comprises at least three module strings and the control device is configured to set the periodic switching sequences of the module strings phase-offset in relation to one another and in this way to generate a rotary phase AC voltage at the respective battery terminals of the module strings.

4. The battery device as claimed in claim 3, wherein respectively another end of the series is electrically connected to a common neutral point in each module string.

5. The battery device according to claim 3, wherein the control device respectively provides at least one string control unit for each module string and provides a central control unit for all module strings together, wherein each string control unit of each module string is configured to carry out the respective switching sequence of the module string independently and for this purpose to set a switching rate in dependence on a predetermined frequency value, and the central control unit is configured to set a frequency value in the string control units and to trigger the switching sequences of the module strings in a phase-offset manner.

6. The battery device as claimed in claim 1, wherein each module string is formed from at least two partial module strings connected in a series circuit and wherein each partial module string comprises a part of the series of the plurality of module units.

7. The battery device as claimed in claim 1, wherein each of the module units comprises two terminal contacts, via which the each module unit is connected in the series of the respective module string, and in the respective bridging circuit, at least one semiconductor switch is configured to electrically connect the two terminal contacts in the electrically conductive state, and at least one further semiconductor switch is configured to switch an electrical connection between at least one cell terminal of battery cells of each module unit and one of the terminal contacts.

8. The battery device as claimed in claim 1, wherein the AC voltage (L1, L2, L3, LN) has a stepped, sinusoidal time curve.

9. A motor vehicle having a traction drive, which comprises an electrical machine, in which a stator is configured to receive a rotary phase AC voltage for generating a magnetic rotary field at stator windings, wherein the motor vehicle comprises a battery device having at least one module string, in which a plurality of module units, each of the plurality of module units comprising at least one battery module, are electrically interconnected one after another in a series, wherein one end of the series is electrically connected to a respective battery terminal of the battery device, wherein each of the plurality of module units is provided with a respective bridging circuit, which is configured to alternately bridge each module unit and interrupt the bridging again in dependence on a switching signal, wherein a control device is configured to bridge at least some of the plurality of module units in chronological succession and chronologically thereafter to interrupt the bridgings again by setting the switching signal in periodically successive switching sequences, so that a periodic AC voltage (LI, L2, L3, LN) having multistep drop and multistep rise results at the respective battery terminal of the module string wherein the battery device is configured to carry out a recuperation in operation of the electrical machine by means of the battery device, in order to use a generator voltage generated by the electrical machine at the respective battery terminal and a further battery terminal for charging the plurality of module units, by a sufficient number of the plurality of module units always being connected in series in the at least one module string in a manner adapted to a time curve of the generator voltage in such a way that a charging current for the plurality of module units, which has at most a predetermined charging current strength, occurs by means of an instantaneously available voltage value of the generator voltage, wherein the respective battery terminal of each of the at least one module string of the battery device is electrically connected to respectively one of the stator windings of the stator.

10. A method for operating a battery device, which comprises: at least one module string, each of the at least one module string having a plurality of module units, each of the plurality of module units comprising at least one battery module, wherein the plurality of module units of each module string are interconnected in a series, and wherein in each case at least some of the plurality of module units are successively bridged and thereafter the bridgings are interrupted again successively by a control unit in the at least one module string in each case by means of a switching signal in periodically successive switching sequences, so that a periodic AC voltage (L1, L2, L3, LN) having multistep drop and multistep rise occurs at a respective battery terminal of the module string wherein the battery device also carries out a recuperation in operation of an electrical machine by means of the battery device, in order to use a generator voltage generated by the electrical machine at the respective battery terminal and a further battery terminal for charging the plurality of module units, by a sufficient number of the plurality of module units always being connected in series in the at least one module string in a manner adapted to a time curve of the generator voltage in such a way that a charging current for the plurality of module units, which has at most a predetermined charging current strength, occurs by means of an instantaneously available voltage value of the generator voltage.

* * * * *